United States Patent
Bohlender et al.

(10) Patent No.: US 9,297,551 B2
(45) Date of Patent: Mar. 29, 2016

(54) HEAT GENERATING ELEMENT

(71) Applicant: Eberspächer catem GmbH & Co. KG, Herxheim (DE)

(72) Inventors: Franz Bohlender, Kandel (DE); Michael Niederer, Kapellen-Drusweiler (DE); Christian Morgen, Rülzheim (DE)

(73) Assignee: Eberspächer catem GmbH & Co. KG, Herxheim (DE)

( * ) Notice: Subject to any disclaimer, the term of this patent is extended or adjusted under 35 U.S.C. 154(b) by 469 days.

(21) Appl. No.: 13/723,444

(22) Filed: Dec. 21, 2012

(65) Prior Publication Data

US 2013/0161316 A1    Jun. 27, 2013

(30) Foreign Application Priority Data

Dec. 22, 2011 (EP) .................................... 11010084

(51) Int. Cl.
| | |
|---|---|
| *H05B 3/50* | (2006.01) |
| *F24H 3/04* | (2006.01) |
| *B60H 1/22* | (2006.01) |
| *F24H 1/00* | (2006.01) |
| *H04B 3/50* | (2006.01) |
| *H05B 3/28* | (2006.01) |

(52) U.S. Cl.
CPC ............ *F24H 3/0405* (2013.01); *B60H 1/2215* (2013.01); *B60H 1/2225* (2013.01); *F24H 1/009* (2013.01); *H04B 3/50* (2013.01); *H05B 3/286* (2013.01); *H05B 2203/016* (2013.01); *H05B 2203/023* (2013.01)

(58) Field of Classification Search
CPC .............. H05B 3/06; H05B 3/30; H05B 3/50; H05B 2203/02; F24H 3/0405; F24H 3/0435
USPC ......... 219/202, 204, 520, 533, 537, 540, 541, 219/544, 548
See application file for complete search history.

(56) References Cited

U.S. PATENT DOCUMENTS

| | | |
|---|---|---|
| 5,665,261 A | 9/1997 | Damsohn et al. |
| 7,182,654 B1 * | 2/2007 | Gracki et al. ................. 439/851 |
| 2004/0200829 A1 | 10/2004 | Hamburger et al. |
| 2006/0138712 A1 | 6/2006 | Hamburger et al. |
| 2007/0068913 A1 | 3/2007 | Zeyen et al. |

(Continued)

FOREIGN PATENT DOCUMENTS

| | | |
|---|---|---|
| DE | 20305936 U1 | 7/2003 |
| EP | 2190256 A1 | 5/2010 |
| EP | 2276321 A1 | 1/2011 |

(Continued)

OTHER PUBLICATIONS

European Search Report Dated Jun. 18, 2012 for European Patent Application Serial No. EP 11 01 0084.

*Primary Examiner* — Brian Jennison
(74) *Attorney, Agent, or Firm* — Boyle Fredrickson, S.C.

(57) ABSTRACT

A heat generating element for an electrical heating device of a motor vehicle has a positional frame, which forms a receptacle in which at least one PTC element is accommodated, and additionally has contact plates abutting on two oppositely situated sides of the PTC element. With a view to providing well-insulated support of the PTC element, several supporting points are arranged in circumferential direction of the receptacle.

21 Claims, 17 Drawing Sheets

(56) References Cited

U.S. PATENT DOCUMENTS

2007/0068927 A1*  3/2007  Bohlender et al. ............ 219/505
2007/0095809 A1   5/2007  Lee

FOREIGN PATENT DOCUMENTS

FR        2826829  A1   1/2003
JP      2008084827  A    4/2008

* cited by examiner

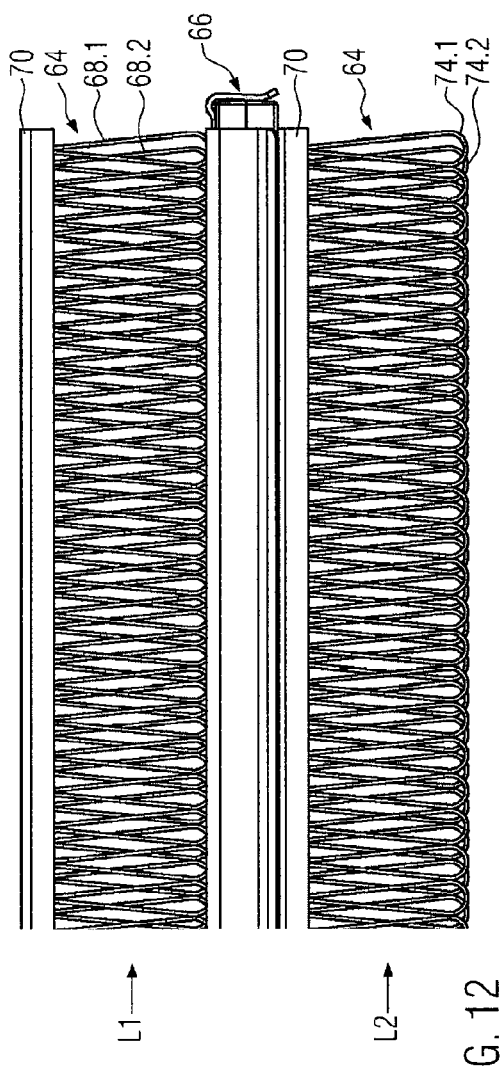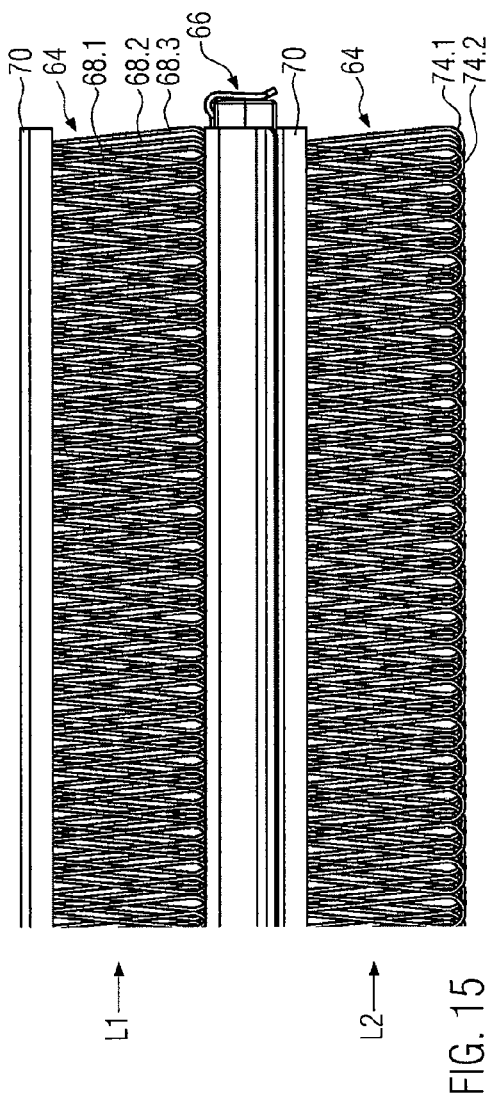

HEAT GENERATING ELEMENT

BACKGROUND OF THE INVENTION

1. Field of the Invention

The present invention relates to a heat generating element, particularly for an electrical heating device of a motor vehicle, having a positional frame, which forms a receptacle in which at least one PTC element is accommodated, and contact plates abutting on two oppositely situated sides of the PTC element.

In particular, the present invention relates to a heat generating element of an electrical heating device for a motor vehicle, whereby the heating device has a frame which, on opposite sides, forms openings for the passage of a medium to be heated. Arranged in the frame is a layer structure that accommodates the aforementioned heat generating element, whereby in the layer structure, in each case corrugated-rib elements abut normally on oppositely situated sides of the heat generating element in a manner that conducts heat in order to discharge regularly the heat generated by the heat generating element to the medium that is to be heated, which medium usually is air.

2. Description of the Related Art

An electrical heating device of this nature is for example known from DE 199 11 547, U.S. Pat. No. 5,854,471, EP 0 350 528 or DE 197 06 199.

EP 1 768 457 A1, which originates with the applicant, can be seen as type-defining for the heat generating element that forms the object of the present invention. In this state of the art, the receptacle formed by the positional frame has on its inner circumference a spacing element which bridges an insulating gap that is to be provided between the plastic material of the positional frame and the PTC element.

By means of this, a highly insulating support of the PTC element in the positional frame formed from a plastic material that is unspecific with regard to its electrical conductivity is to be improved. According to this state of the art, the insulating support element is formed from a silicon strip that is attached to the inner circumferential surface of the positional frame by means of a tongue and groove joint.

This previously known suggested solution is relatively elaborate because the silicone strip must be joined to the plastic material of the positional frame at a later time. The same applies to the parallel suggested solution according to EP 1 768 458 A1.

For example, EP 1 768 457 A1 and EP 1 768 458 A1 each disclose solutions for heat generating elements that should be suitable for high voltage use. The solutions presented there are, however, seen as in need of improvement with respect to an insulating support of the PTC element in the positional frame.

SUMMARY OF THE INVENTION

The object of the present invention is to provide a heat generating element in which the PTC element has an insulated support in an improved manner.

To resolve this problem, the heat generating element of the type mentioned at the beginning is further developed by means of several supporting points provided in the circumferential direction of the receptacle. These supporting points protrude beyond the otherwise flat surface sections of the receptacle, whereby these surface sections normally extend in the insertion direction and normally form the inner circumferential surface of the receptacle. The supporting points form regularly punctiform support positions by means of which the PTC element is held spaced at a distance to the surface sections of the peripheral surface, which is formed by the positional frame. The positional frame can be manufactured from an electrically high insulating material, such as plastic or ceramics or other materials that are mentioned in EP 1 768 457 A1 and whose disclosure is included to this extent in the disclosure content of this application.

Significant for the invention, however, are the supporting points, which are preferably arranged such that the PTC element or all the PTC elements accommodated in the one receptacle are arranged regularly spaced apart circumferentially with respect to the inner circumferential sections of the positional frame. By means of this, the air clearance and creep path are increased. This accordingly prevents the PTC elements from coming, with their edges that join the surfaces of opposite polarity, into a position resting flat on a contact partner, i.e., on the positional frame or on a spacing element that is held by the positional frame. This increases the creep path between the contact bases of different polarity for the contact plates. The creep path between the surfaces of the PTC element or elements, said surfaces energised with different polarity, and the positional frame is also enlarged, so that the PTC elements are provided in the receptacle in a manner that has improved insulation.

The further development accordingly allows safer operation of the heat generating element at high currents.

Normally, on oppositely situated side walls, at least two supporting points are provided on which the PTC element is or the PTC elements are supported, so that the edges of the PTC elements extend essentially parallel to the inner circumferential sections of the receptacle. The supporting points are thereby normally formed fully circumferentially on the receptacle in order to ensure, on each circumferential section of the inner circumferential surface of the receptacle, a desired spacing between the PTC element and the inner circumferential surface of the positional frame. The provision here of two supporting points assigned to only one PTC element on each of the inner circumferential sections of the receptacle provided parallel to an edge of the PTC element is not necessarily required. For example, it is particularly conceivable that on the face side of an elongated positional frame with an elongated receptacle for PTC elements, only one supporting point for a face-side edge of the PTC element is provided.

For further enlargement of the creep path across the contour that is also given by the supporting points, according to a preferred further development of the present invention it is suggested to form the supporting points such that they taper to a point. The tip of the supporting point here is normally located at half the height of the receptacle and consequently of the PTC element. The supporting points are preferably formed such that they taper to a point in two levels, so that support of the PTC element by means of a very small surface section, normally a tip of the supporting point, can occur, as a result of which the creep path is reduced overall. The supporting points accordingly appear preferably both in a cross-sectional view through the positional frame and also in a plan view onto the positional frame and in the receptacle as an embodiment that tapers to a tip. In other words, the supporting points are formed tapering to a point both in the height and in the circumferential direction.

For further lengthening of the creep path, according to a preferred further development of the present invention it is suggested that the supporting points have a curved surface. Due to this curvature, the creep path is also lengthened on the supporting points. Normally the supporting points here are curved in a concave manner so that the best possible lengthening of the creep path also arises on the supporting points.

According to a further preferred embodiment and for the lengthening of the creep path with respect to the positional frame, according to a preferred further development of the present invention it is suggested to arrange the contact plates spaced at a distance from the positional frame. The contact plates here can be joined to the PTC elements by means of pressing and/or frictionally or positively and fixed in place by these. Normally further elements are provided that hold the contact plates at a distance from the positional frame. The contact plates are accordingly substantially smaller than the accommodation space for the PTC elements formed by the receptacle, so that a circumferential gap arises between the contact plates and the inner circumferential sections of the positional frame, whereby the inner circumferential sections bound the receptacle. Due to this circumferential gap, direct contacting between the energized contact plates and the positional frame is prevented and the creep path is thereby enlarged.

According to a further preferred embodiment of the present invention, the contact plates have on the outside a film abutting the positional frame in a sealing manner. This film can be an adhesive foil that is glued to the assigned contact plate and/or to the positional frame. The PTC element can thereby be given a certain fixation. The film can also be glued to the positional frame by means of its own adhesive layer and thereby sealed with respect to same. Alternatively or additionally, the positional frame can run, normally fully circumferentially, around the at least one receptacle or the several receptacles on the outside, i.e., it can extend essentially parallel to an outer edge of the positional frame, so that an inner area of the positional frame, said inner area accommodating the PTC elements, is sealed with respect to the surroundings. Normally this circumferential adhesive edging is required in order to create contacting between the insulating layer of the heat generating element, said insulating layer covering the contact plate on the outside, and the positional frame, which leads to a further increase in the creep path. In this preferred further development, the contact plates normally have a surface area corresponding to the surface areas taken by the PTC element or PTC elements within the positional frame. The insulating layer is protruded along the outer circumference and does not lie indirectly on the positional frame until close to the outer edge of the positional frame and over the adhesive edging.

The previously discussed further development accordingly preferably has an insulating layer that is supported with respect to the positional frame only by circumferential adhesive edging that is formed close to the edge on the positional frame. Contacting between the insulating layer and the positional frame that goes beyond this does not normally exist.

According to a preferred further development of the present invention, at least one insulating layer, preferably the insulating layer that has already been discussed, is covered by a sheet metal cover that is joined to the positional frame. In this way, the receptacle for the PTC element or PTC elements is provided with screening, so that a heat generating element is given that can establish EMC problems only to a reduced extent. The operation of the heat generating element particularly at high currents leads namely, as is known, to corresponding electromagnetic disturbances that, particularly in a motor vehicle, are unwanted and should be suppressed. The sheet metal cover can thereby be joined to the positional frame, for example and preferably, by an edge that surrounds essentially fully circumferentially the positional frame. This edge can be used for clipping the sheet metal cover to the positional frame. The edge here normally extends across the entire height of the positional frame, i.e., at least from close to to completely to the oppositely situated contact base side. There, after installation in a heating block of an electric auxiliary heater, the heat generating element can be given a sheet metal cover that is assigned to one or more corrugated-rib elements. Accordingly, by means of the sheet metal cover assigned to the positional frame on the one side and the sheet metal cover assigned to the corrugated-rib element or elements on the other, two-sided screening is produced that normally envelops the receptacle of the positional frame almost completely or fully completely so that the receptacle has the best possible support and consequently the best possible EMC protection is produced.

According to a further preferred embodiment of the present invention, the contact plates are provided only within an envelope surface that is specified by the positional frame. In other words, in this embodiment the contact plates do not protrude over the positional frame. This distinguishes the present suggestion from the disclosure of EP 1 768 457 A1 or EP 1 768 458 A1. There the contact plates are reshaped for the formation of the connecting lugs that protrude on the face side over the positional frame by means of punching and bending. In the previously discussed further development, on the other hand, the surface area of the contact plates in a plan view on to the positional frame is in any case smaller than the surface area of the positional frame. The contact plates do not protrude over the external edge of the positional frame and consequently over the envelope surface specified by the positional frame. This specification applies to both contact plates.

According to a further preferred embodiment of the present invention, the positional frame has channels that project outwards for the accommodation of the contact elements that lead to the contact plates. These contact elements can be arranged within an electrical heating device with the heat generating elements such that these contact elements are also located within screening, so that the entire current conveyance to the heat generating element is equipped in the best possible manner with respect to the EMC problem. The outwardly-projecting channels can here also be formed for sealing the heat generating elements with respect to a control housing or connecting housing, which normally connects electrically several heat generating elements provided in the heating block to their contact elements.

With a view to the most economical manufacture possible, according to a preferred further development of the present invention it is suggested to form the contact plates such that they are identical. The corresponding applies to the insulating layers. It is consequently not possible to mount the heat generating element incorrectly due to mixing up the contact plates or insulating layers with their assigned areas of the heat generating element. In consideration of the most economical manufacture possible, according to a preferred further development of the present invention it is suggested to join the contact plates to the positional frame by means of clip connections. The positional frame accordingly normally has clip ridges which are formed according to the dimensions of the contact elements, whereby the contact elements and the clip ridges are provided in identically formed clip openings. The corresponding clip connections are normally provided on face-side ends of the contact plates. After the assembly, the contact plate is accordingly connected on the end on the one side by a clip connection between the clip ridge, which is formed as one part on the positional frame and the contact element, which is slid into the channel. It is self-evident that in this embodiment, each contact plate is given female clip element receptacles on the oppositely situated side. These are normally formed from the material that forms the contact plates by means of punching and bending.

BRIEF DESCRIPTION OF THE DRAWINGS

Further details and advantages of the present invention are given in the following description of embodiments in conjunction with the drawing. Here, the drawing illustrates the basic construction of an electrical heating device into which a heat emitting element is built, which itself can be solely essential to the invention. The drawing shows the following:

FIG. 12 a side view of the embodiment of a heating bar illustrated in FIG. 10;

FIG. 15 a side view of the further embodiment of a heating bar illustrated in FIG. 13;

DETAILED DESCRIPTION OF THE PREFERRED EMBODIMENTS

Figure 1:
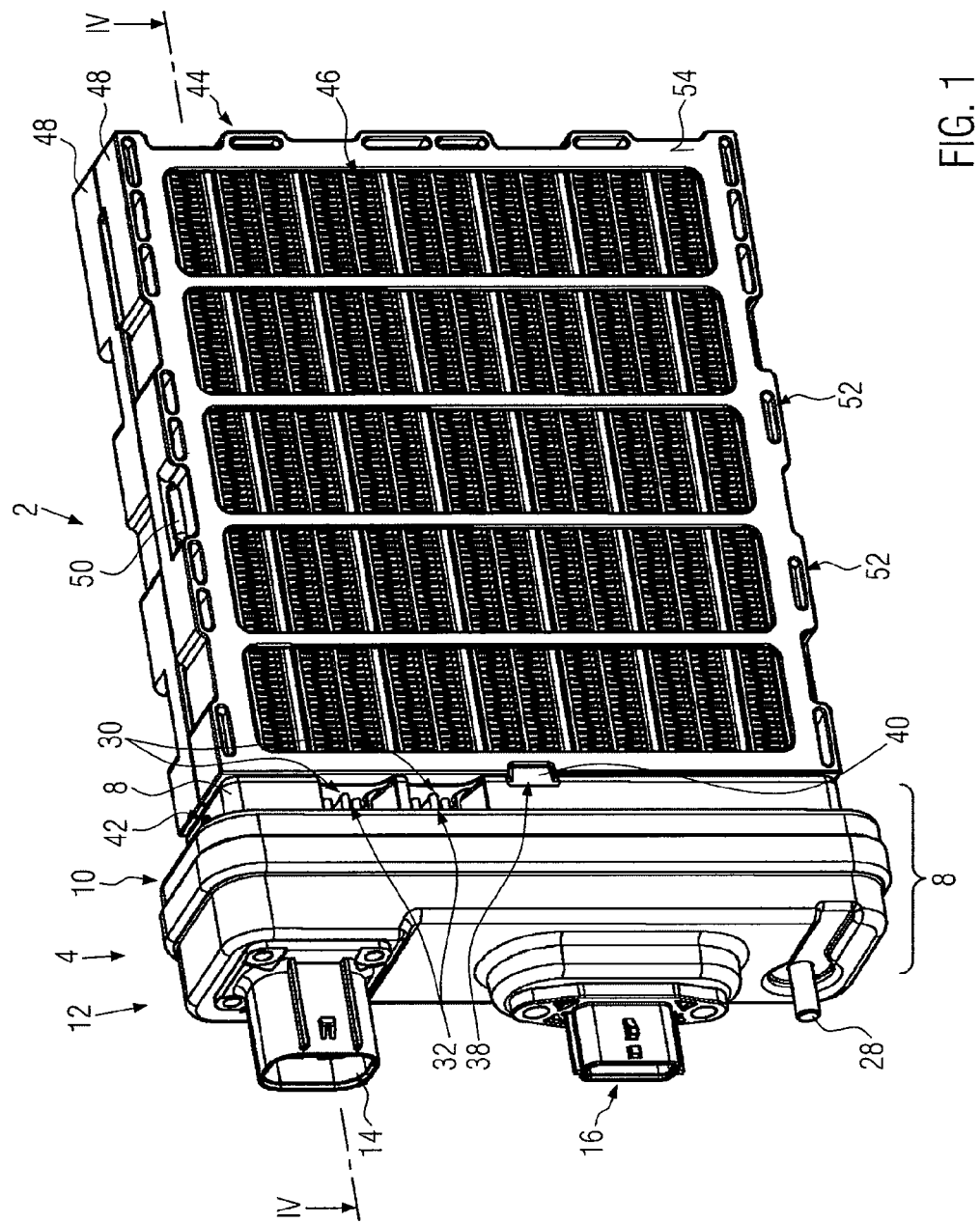
FIG. 1 a perspective side view of an embodiment of an electrical heating device for a motor vehicle.

FIG. 1 illustrates an embodiment of an electrical heating device with a power section labeled with the reference numeral 2 and a control section labeled with the reference numeral 4. The power section 2 and the control section 4 form a constructional unit of the electrical heating device.

Figure 4:
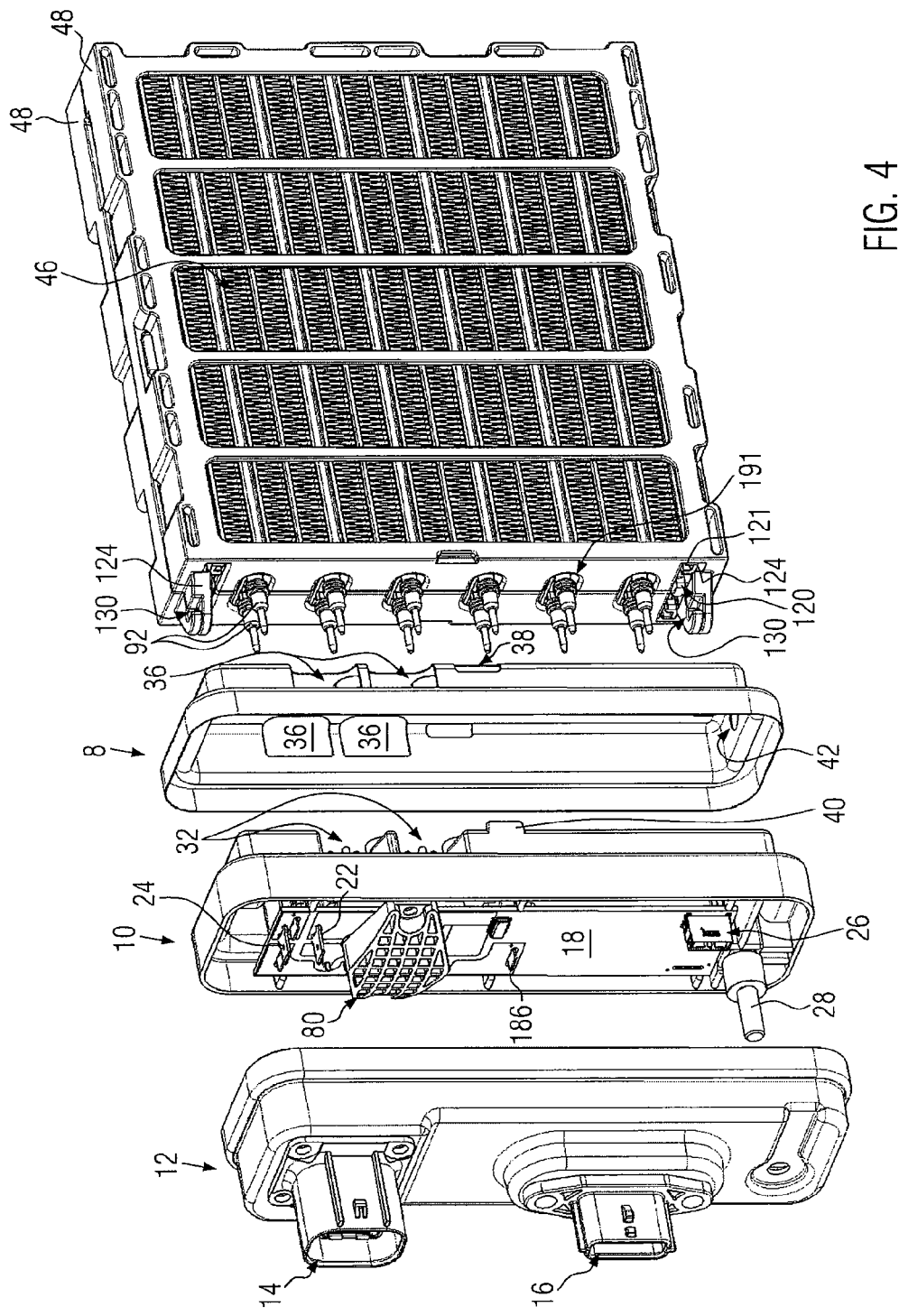
FIG. 4 a perspective side view of the embodiment illustrated in FIG. 1 in an exploded view of the main constituent parts of the embodiment.

The control section 4 is formed on the outside by a connecting housing 6, which—as shown particularly in the illustration according to FIG. 4—consists of a screening housing 8, which is formed as, for example, a deep-drawn or cast, respectively deep-drawn metal shell, a plastic housing element 10, which is inserted into the metal shell 8 and a housing cover 12. In the joined state the housing cover 12 can grasp over a free flange of the sheet metal cup 8 and be formed of metal so that the interior of the control section 4 is completely screened by a metallic connecting housing 6. The housing cover 12 can however also be formed from plastic.

The housing cover 12 bears a female plug housing 14 for the power current and a further female housing element which is formed as a control plug housing 16. Both plug housings 14, 16 are joined as plastic elements to the metallic housing cover 12 and form guide and sliding surfaces for in each case a male plug element which is not illustrated.

The plastic housing element 10 accommodates a conductor board 18 within it which is partially covered by a pressure element 20 which is explained in more detail in the following. The conductor board 18 has a plus connecting contact 22 and a minus connecting contact protruding over it, which lie exposed in the power plug housing and are electrically connected to the strip conductor. The conductor board 18 furthermore bears a control contact element 26 which contains control element contacts and which can be reached by lines via the control plug housing 16. As can be seen from FIG. 4, the control plug housing 16 is arranged offset to the control contact element 26. This distance is required due to the installation situation of the electrical heating device in the motor vehicle. The electrical contacting between the control contact element 26 and the control plug housing 16 or the contact elements provided there occurs through the electrical leads which are routed inside the housing cover 12. Furthermore, in the assembled state the housing cover has a connecting bolt 28 protruding over it for the ground connection which is electrically connected to the screening housing 8.

Figure 5:
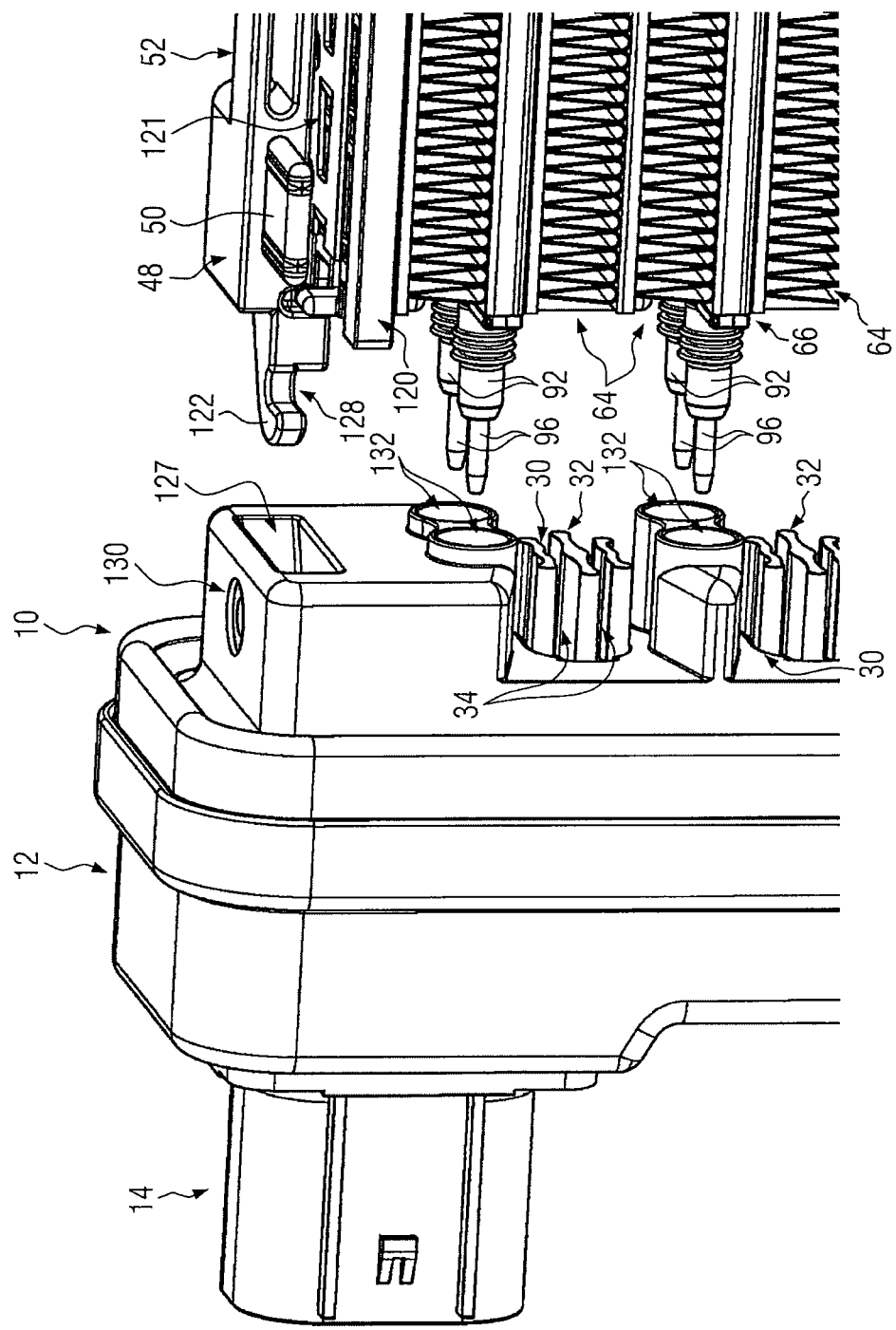
FIG. 5 a joining region between a connecting housing and a layer structure of the embodiment of an electrical heating device illustrated in FIGS. 1 and 4 with the omission of various elements.

On the end side oppositely situated to the conductor board 18 the plastic housing element 10 forms two cooling channels 30 for heat sinks 32 which are only indicated in FIG. 4, but can be recognized more clearly in FIGS. 1 and 5. The free end of the heat sinks 32 comprises several cooling ridges extending essentially parallel to one another which define in each case air passage channels 34. The heat sinks 32 are made of a good thermally conducting material, for example aluminium or copper.

The omitted sheet metal shell 8, which is not illustrated in FIG. 5, has, as elucidated in particular in FIGS. 1 and 4, corresponding to the cooling channels 30, oppositely situated passage openings 36 for air which are provided as entry and exit openings for the cooling channels 30. These passage openings 36 are formed in the metal shell 8. At about central height in the longitudinal direction the metal shell 8 has latching openings 38, through which after the final assembly of the control section 4 on the power section 2 latching lugs 40 penetrate, which are positively locked in engagement with the power section 2 and formed on the outer edge of the plastic housing element 10 (cf. FIG. 1). On oppositely situated face sides the metal shell 8 also has in each case mounting holes 42 which will be dealt with in more detail in the following (cf. FIG. 4).

The power section 2 has a frame 44 which is circumferentially enclosed in the embodiment according to FIG. 1 and circumferentially surrounds a layer structure labeled with the reference numeral 46 which is also designated as a heating block. The frame 44 is formed from two frame elements 48, which are latched together by latching connections which are labeled with reference numeral 50 (male latching element) and reference numeral 52 (female latching element), in particular in FIG. 16.

On oppositely situated outer sides 54 the frame 44 forms in each case openings 56 for the passage of air to be heated by the air heater illustrated in the embodiment. In the illustrated embodiment these openings 56 are stiffened by lateral struts 58, which join oppositely situated side edges of the frame 44.

In its interior the frame 44 defines an accommodation space 60 which is adapted such that the layer structure 46 can be accommodated closely fitted in the frame 44.

Figure 10:
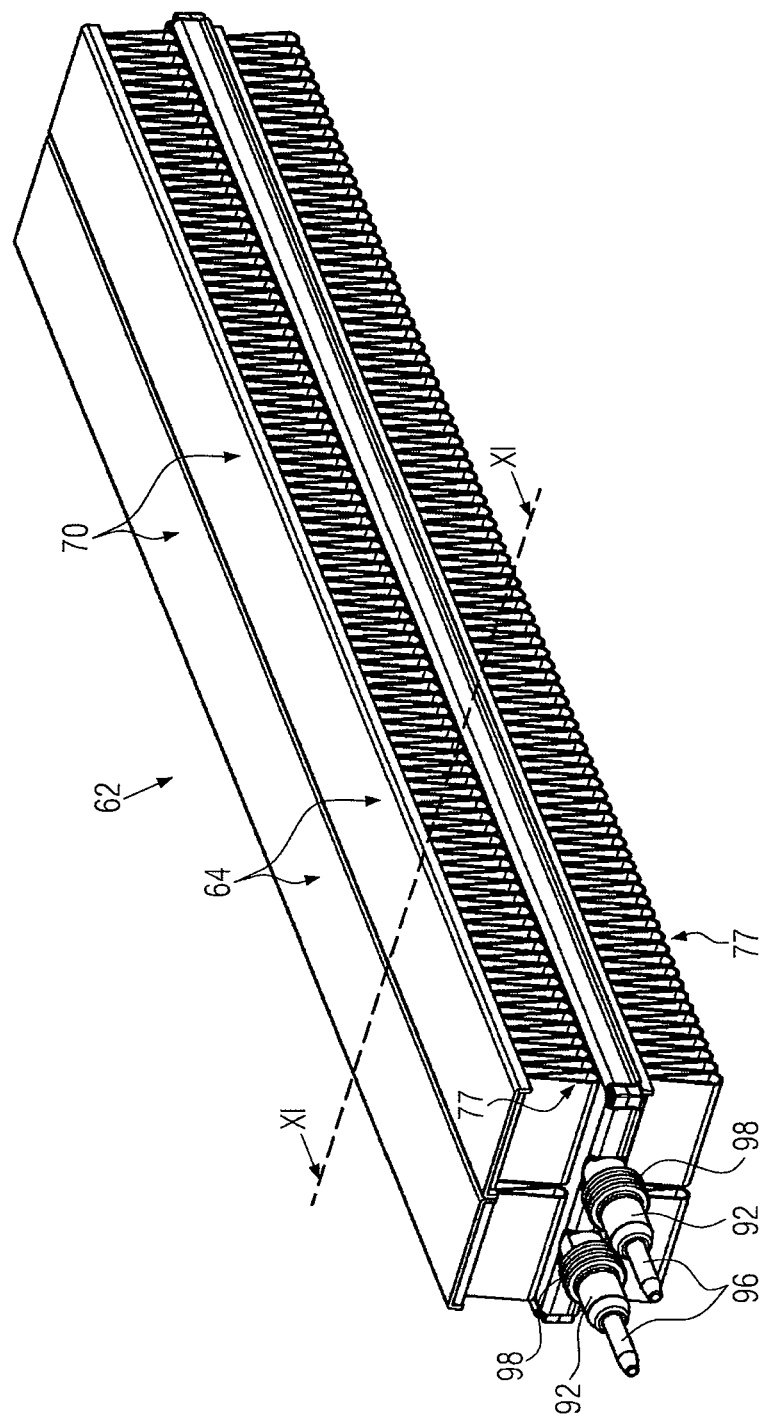
FIG. 10 a perspective side view of a first embodiment of a heating bar which can be built into the electrical heating device according to FIG. 1.
Figure 13:
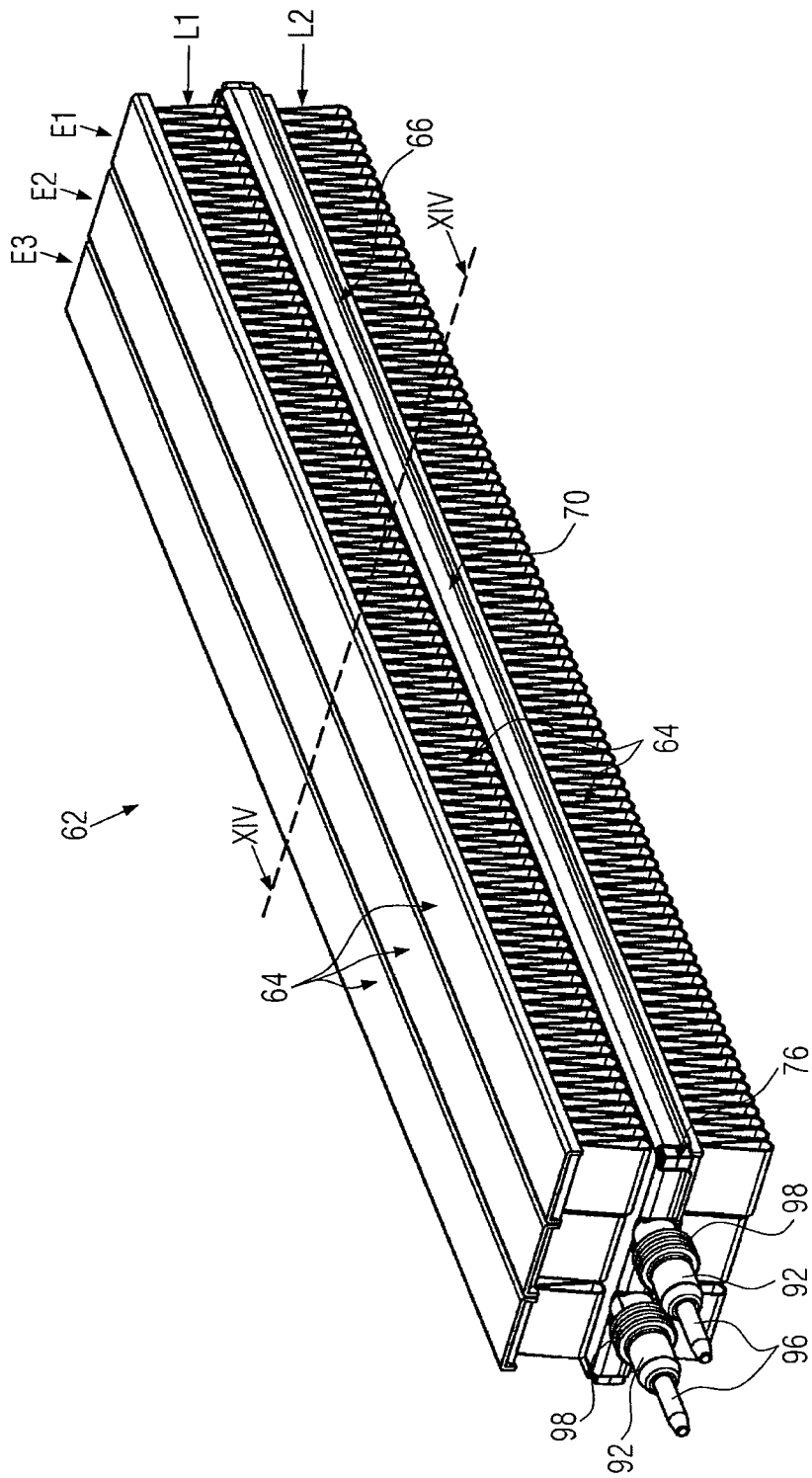
FIG. 13 a perspective side view according to FIG. 10 onto an alternative embodiment of a heating bar.

The heating block or layer structure 46 is essentially formed by the heating bars 62 which are illustrated in FIGS. 10 and 13 and which are arranged one above the other layered in the receptacle 60. The heating bars 62 consist of at least two corrugated-rib elements 64, which accommodate a heat generating element 66 between them. As FIGS. 10 and 11 elucidate, the corrugated-rib elements consist of meander-type, bent sheet metal strips 68, which are covered on one side by a sheet metal cover 70 and grasped at the edge by a bent edge 72 of the sheet metal cover 70. The respectively other upper side of the meander-type bent sheet metal strips 68 is free and is directly formed by bent free ends 74 of the sheet metal strip 68. With the heating bar 62 illustrated in FIGS. 10 and 11 in the passage direction of the air to be heated, i.e. at right angles to the surface of the frame 44 clamped by the outer sides 54, two corrugated-rib elements 64 are provided in each case adjacently. This arrangement of corrugated-rib elements 64 provided one behind the other in the flow direction forms a layer. Here, in each layer labeled with the reference letter L one corrugated-rib element 64 is provided in each case per level E. S indicates the flow direction of the air flow to be heated in FIG. 11. Accordingly, this first meets the first level E1, i.e. the corrugated-rib elements 64 of the first layer L1 and the second layer L2 provided in the first level and only thereafter the corrugated-rib elements 64 provided in the second level E2. The corrugated-rib elements 64 are here arranged in the flow direction S, i.e. strictly one behind the other at right angles to the outer side 54 defining the opening 56. Here, the heat generating element 66 forms a flat contact base for the corrugated-rib elements 64.

Figure 2:
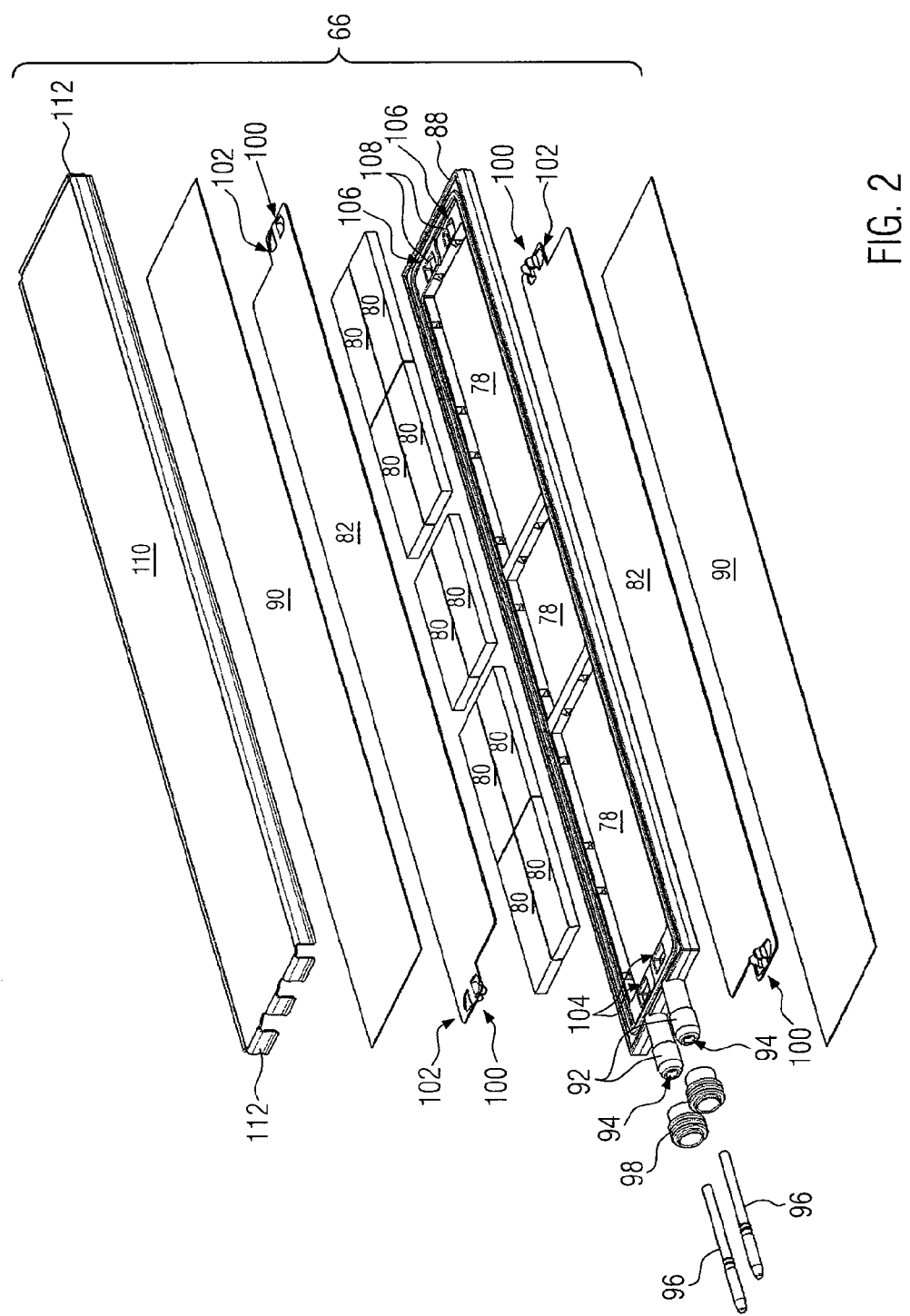
FIG. 2 a perspective, exploded side view of a heat generating element of the electrical heating device illustrated in FIG. 1.

As can be seen especially from FIG. 2, the heat generating element 66 consists of several layers lying one above the other. The heat generating element 66 is essentially constructed symmetrically, whereby a positional frame labeled with the reference numeral 76 and made from an electrically insulating material, in particular plastic, is provided in the centre. The positional frame 76 forms in the present case three receptacles 78 for PTC elements 80. Several, at least two, PTC elements 80 are accommodated in a receptacle 78. Both outer receptacles 78 each accommodate four PTC elements 80. Contact plates 82 abut oppositely situated sides of the PTC elements 80. These two contact plates 82 are formed identically and punched out from electrically conducting sheet metal. The contact plates 82 are placed on the PTC elements 80 as separate elements, with the positional frame 76 or at least the receptacle of the positional frame 76 sandwiched in between the contact plates 82. They can be additionally provided with a vapor deposited electrode layer, as generally normal. The electrode layer is however not a contact plate 82 for the purpose of the invention.

Figure 11:
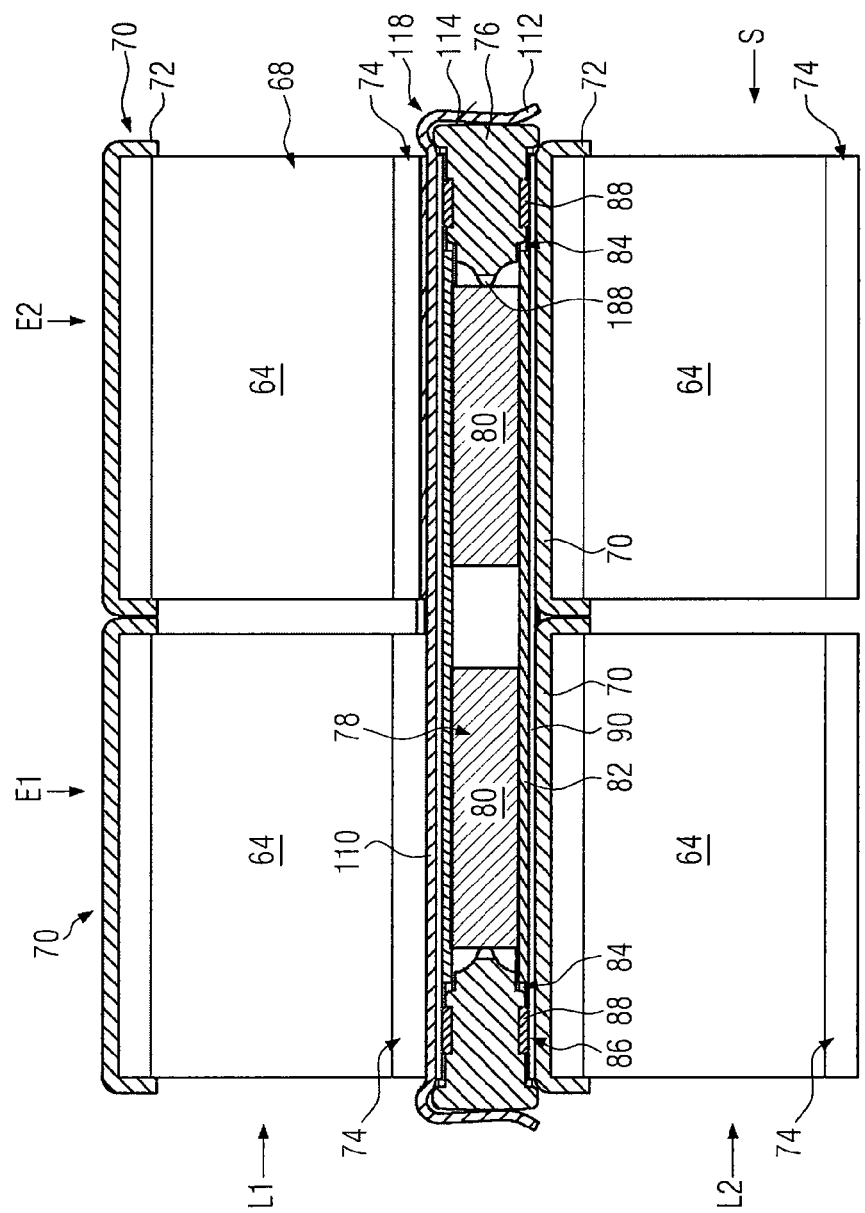
FIG. 11 a cross-sectional view along the line XI-XI according to the illustration in FIG. 10.

As FIG. 11 particularly shows, the PTC element 80 assigned to a level E1 is located within the front and rear sides of the assigned corrugated-rib elements 64. In other words there is no PTC element 80 located between two corrugated-rib elements 64 provided in one layer L1. In this way a thermal interaction between the PTC elements of different levels E1, E2 is avoided.

The contact plates 82 are dimensioned such that they are accommodated within the positional frame 76, but are arranged circumferentially with a spacing to the positional frame 76. The circumferential gap so formed is labeled with the reference numeral 84 in FIG. 11. At approximately the height of the contact plates 82 the positional frame 76 forms a circumferential sealing groove 86 into which elastomeric adhesive edging 88 is filled as annular beading. This adhesive edging 88 surrounds all the receptacles 78 fully circumferentially and is used for the adherence of an insulating layer with the reference numeral 90, which in the present case is formed from an insulating plastic film and which extends up to a marginal region of the positional frame 76, in any case in the circumferential direction protruding over the adhesive edging 88 with excess. Due to joining the insulating layer 90 with the positional frame 76, facilitated by the adhesive edging 88, the receptacle 78 and the contact plates 82 are hermetically sealed with respect to the outer circumference.

Access to the interior of the positional frame 76 is solely given on the face side of the positional frame 76 and by connection pieces 92 which are formed as one part from its material and which fully circumferentially surround a channel 94 for accommodation of pin-shaped contact elements 96. On their free ends the connection pieces 92 bear sealing elements 98, formed from a thermoplastic elastomer or from PTFE, with a labyrinth type of sealing structure, which can be joined to the associated connection pieces 92 by overmoulding or plugging on. On the face side of each positional frame 76 two connection pieces 92 with identical embodiment and sealing are provided for the accommodation of two contact pins 96 for electrically contacting the contact plates 82.

As can be furthermore taken from FIG. 2, the contact plates 82 have female clip element receptacles 100, manufactured by means of punching and bending, which are formed on sidewards offset protrusions 102 of the contact plates 82, the said protrusions 102 terminating within the circumferential edge provided by the adhesive edging 88 and bridging in each case assigned clip openings 104, 106 formed by the positional frame 76. In the clip openings 106, formed opposite the connection pieces 92 on the positional frame 76, clip ridges 108 are provided, formed with the material of the positional frame 76 as one part. The embodiment and the diameter of these clip ridges 108 correspond to the diameter of a contact pin 96. The contact pins 96 lie exposed in the clip openings 104 and are joined to the female clip element receptacles 100 of the contact plates 82, whereas on the opposite side the female clip element receptacles 100 protrude into the clip openings 106 and are latched with the clip ridges 108. On the connection side of the heat generating element 66 exhibiting the connection pieces 92 the described clip connections can be realized either by positioning the contact plates 82 in their installation position, followed by insertion of the contact pins 96 through the channels 94, or by latching the female clip element receptacles 100 to the contact pins 96 which are already located in position.

On its upper side illustrated in FIG. 2 the heat generating element 66 is provided with a sheet metal cover 110. This sheet metal cover 110 covers the complete insulating layer 90 assigned to the sheet metal cover 110 and has a circumferential edge 112, which frictionally abuts a circumferential marginal area 114 of the positional frame 76 and accordingly secures the sheet metal cover 110 to the positional frame 76 by a clamping force (cf. also FIG. 11). Furthermore, due to the edge 112 exact positioning of the sheet metal cover 110 relative to the external circumference of the positional frame is ensured. At the free end of the edge 112 the sheet metal cover 110 slightly widens conically, which acts as a funnel-shaped insertion opening for the positional frame. The circumferential edge 112 is only penetrated in the corner regions and at the height of the connection pieces 92 and forms a one-sided screen for the heat generating element 66.

Figure 3:
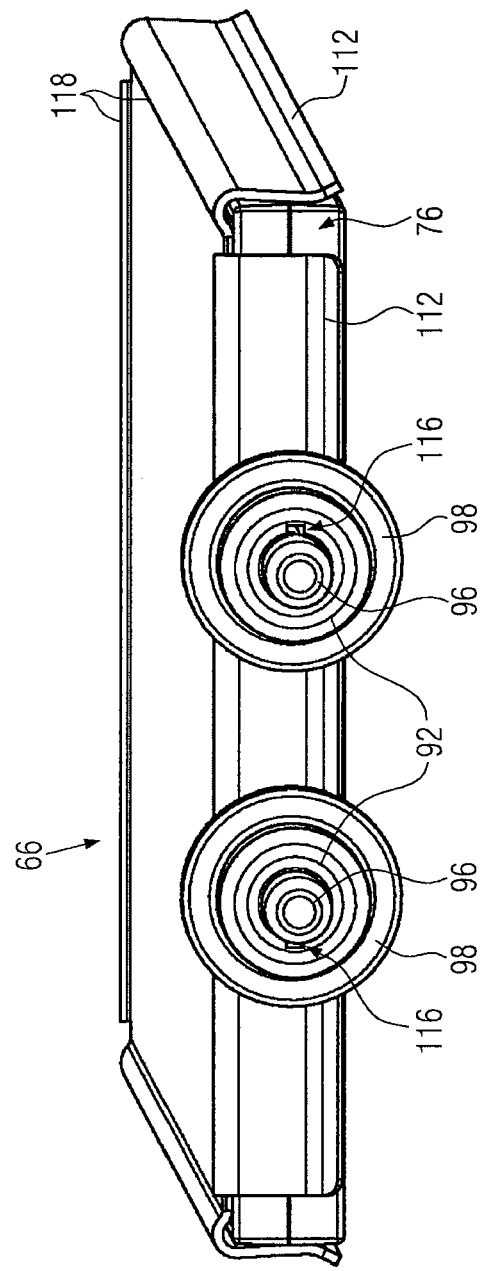
FIG. 3 a perspective face-side view of the embodiment illustrated in FIG. 2.

As FIG. 3 illustrates, the channels 94 formed to match the contact pins 96 are widened radially for the formation of a groove-shaped inspection channel 116. This inspection channel 116 extends from the front free face side of the connection pieces 92 up to the assigned clip opening 104 and accordingly forms an external access to the receptacles 78, which communicate with one another below the insulating layer 90 or the contact plates 82.

As FIG. 3 furthermore illustrates, the sheet metal cover 110 forms a flat contact base between the slightly upwardly bent lip regions 118 for the circumferential edge 112. These lip regions 118 accordingly give a type of centring for the corrugated-rib elements 64 abutting the sheet metal cover 110 (cf. also FIG. 11).

In the illustrated embodiment the previously described layer structure 46 is held in the frame 44 under spring tension. For this purpose the frame 44 has spring insertion openings 120, formed by the two frame elements 48, which can be seen in FIGS. 4 and 5 and which, with the auxiliary heater not yet assembled, are exposed on the face side on the controller side of the power section 2. In these spring insertion openings 120 spring elements 121 are inserted for clamping which are described in EP 2 298 582 originating from the applicant and its disclosure content is included in the disclosure of the present application through this reference. Directly adjacent to these spring insertion openings 120, each of the frame elements 48 forms a retaining element part 122. Each retaining element part 122 formed by a frame element 48 is given an oblique ramp surface 124. The retaining element parts 122 are formed such that with joined frame 44 two retaining element parts 122 assigned in each case to a frame element 48 form complete retaining elements 126 on oppositely situated end sides with the retaining element parts 122 of the other frame element 48. These retaining elements 126 have a tapering embodiment towards the free end, so that the oblique ramp surfaces 124 are used for coarse positioning of the control section 4, namely of a positioning opening 127 of the plastic housing element 10 relative to the power section 2 (cf. FIG. 5). Furthermore, after the joining of the frame elements 48 laterally extending grooves 128 on the retaining element parts 122 form a circumferentially closed hole 130 (cf. FIG. 4). A mounting screw can be fitted into this hole 130 through the mounting hole 42 of the metal shell 8 to provide the positioning and fixing of the power section 2 on the control section 4 to realize one constructional unit for the power section 2 and the control section 4.

Figure 6:
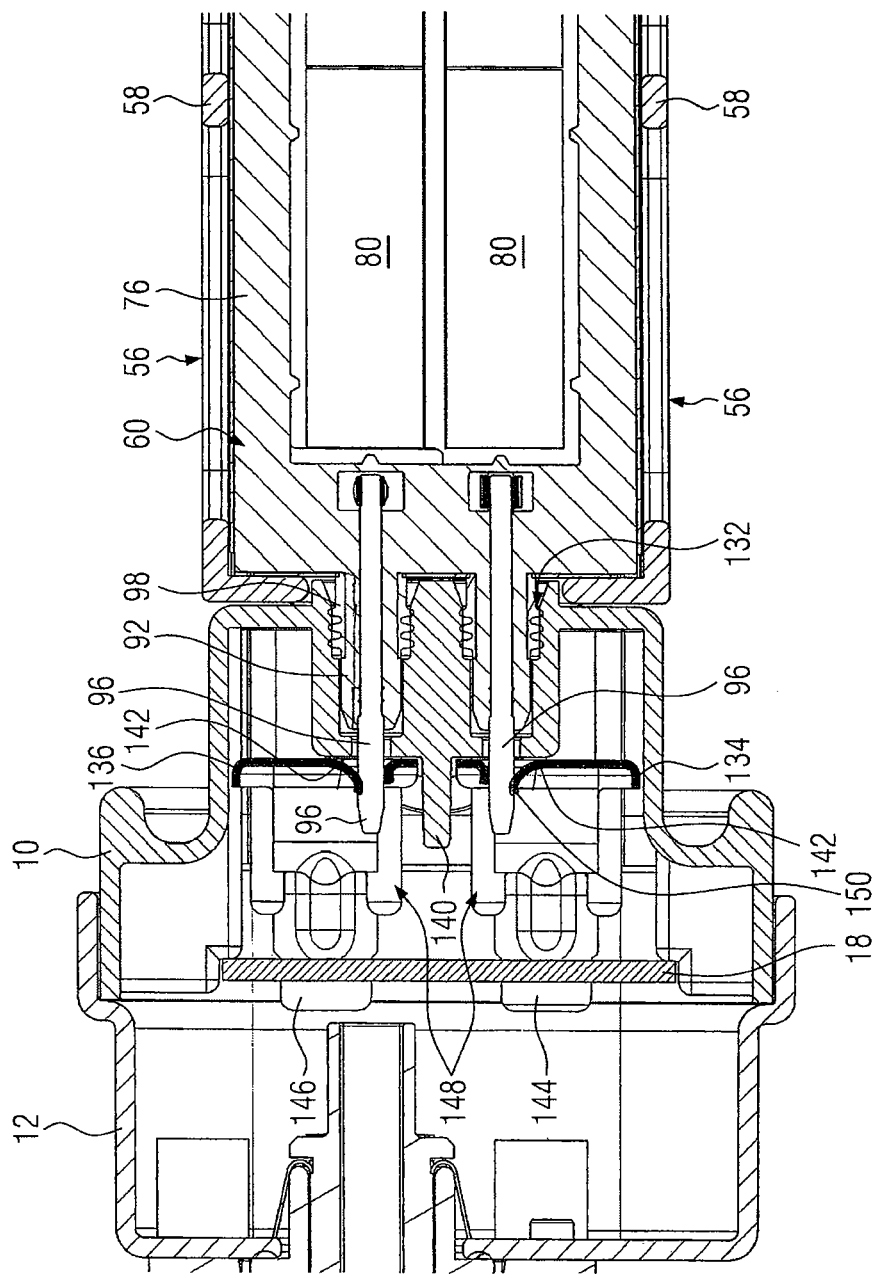
FIG. 6 a cross-sectional view along the line VI-VI according to FIG. 1, i.e. a sectional view through a heat generating element according to FIG. 2 at medium height of the same with omission of the screening housing.

As FIGS. 5 and 6 illustrate, the plastic housing element 10 for each heat generating element 66 forms two cylindrical sleeve receptacles 132 which are matched such that the connection pieces 42 together with the sealing elements 98 can in each case be introduced sealed into assigned sleeve receptacles 132. As FIG. 6 illustrates, the sleeve receptacles 132 are widened conically at the end and have initially a widened cylindrical section for accommodating the sealing element 98 and further inside there is a cylindrical section with a smaller diameter which retains the frontally conically tapering connection piece 92 with slight play and thus limits the deformation of the sealing element 98 after assembly.

Figure 7:
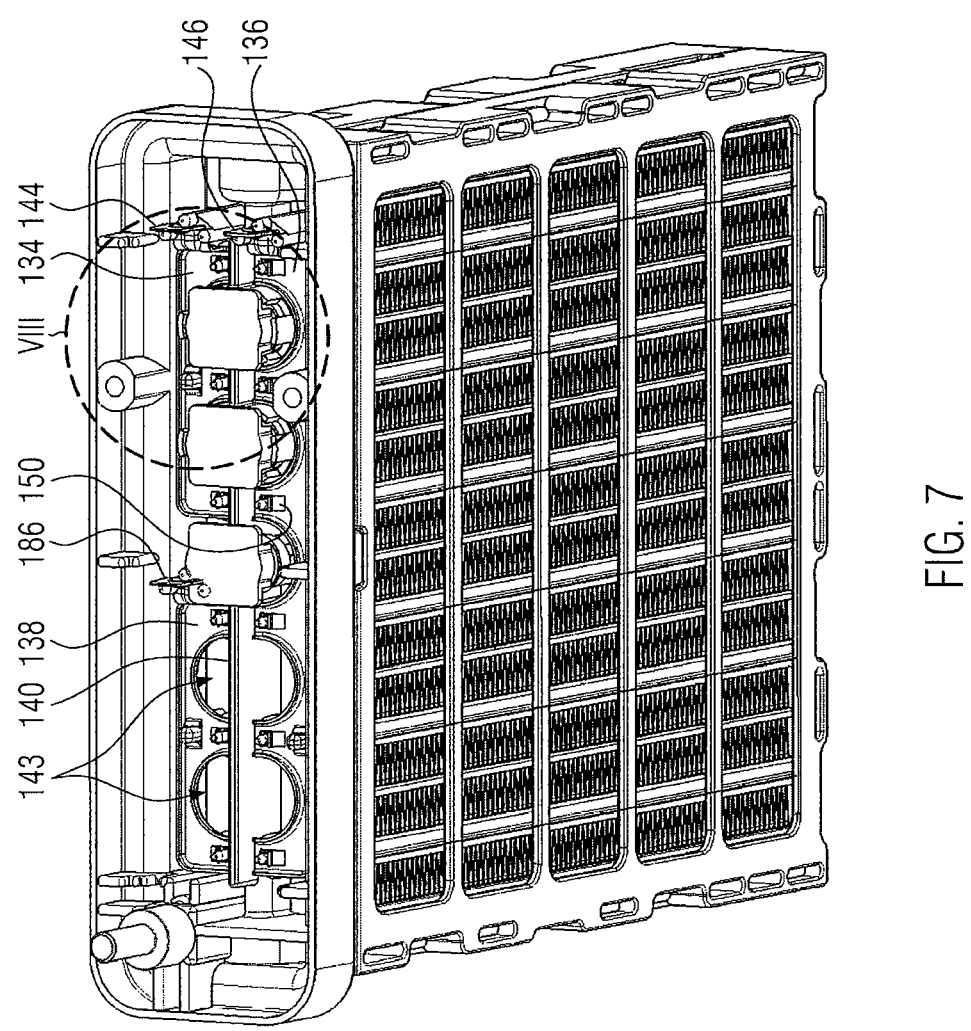
FIG. 7 a perspective face-side view of the embodiment illustrated in FIG. 1 of an electrical heating device, which gives a view into the connecting housing and in which the conductor board and the housing cover are omitted.

The contact pins 96 each penetrate contact surface elements 134 which are formed from sheet metal by punching and bending and which group several contact pins 96 of the same polarity within the connecting housing 6 so that they are assigned to a heating stage. The lower contact surface element is a first plus contact surface element 134, whereas the upper contact surface element is a minus contact surface element 136. As FIG. 7 particularly illustrates, the plastic housing element 10 accommodates a further, second plus contact surface element 138. The minus contact surface element 136 and the plus contact surface elements 134, 138 are separated from one another by a partition ridge 140. This partition ridge 140 protrudes over an abutment level formed by the plastic housing element 10 for the contact surface elements 134, 136, 138. These surfaces of the plastic housing element 10 defined by the abutment level are labeled in FIG. 6 with the reference numeral 142. Due to the ridge 140 the creepage current path between the contact surface elements 134, 138 of the plus polarity and the contact surface element 136 of the minus polarity is extended such that creepage currents between both contacts are not to be expected. Also the air clearance between the contact surface elements 134 and 136, respectively 138 and 136 is displaced. The contact surface elements 134, 136, 138 have semicircular recesses 143 open to the partition ridge 140 between the contact pins 96. In FIG. 6 contact tongues 144, 146 can be seen in each case, which penetrate the conductor board 18 and are formed as one part by punching and bending on the contact surface elements 134 and 136 and which are held raised in contact tongue retention regions 148 relative to the contact bases 142. These details can be seen in FIG. 8. As here illustrated, the respective contact surface elements 134, 136 have at their ends joining lugs 145 which open out into the contact tongues 144, 146. As can be seen furthermore from FIGS. 6 and 8, the contact surface elements 134, 136, 138 for the individual contact pins 96 have formed contact openings manufactured by punching and bending. Accordingly, oppositely situated contact projections 150 abut the external circumference of the contact pins 96 under elastic strain. As can be seen furthermore from FIG. 8, the plastic housing element 10 forms latching projections 152, which are introduced into the latching openings 154 of the contact surface elements 134, 136, 138, which are delimited on the opposite sides of sharp-edged clamping segments 156 of the sheet metal material forming the contact surface elements 134, 136, 138. These clamping segments 156 accordingly claw onto the latching projections 152 and fix the contact surface elements 134, 136, 138 onto the latching projections after being pushed on.

Figure 8:
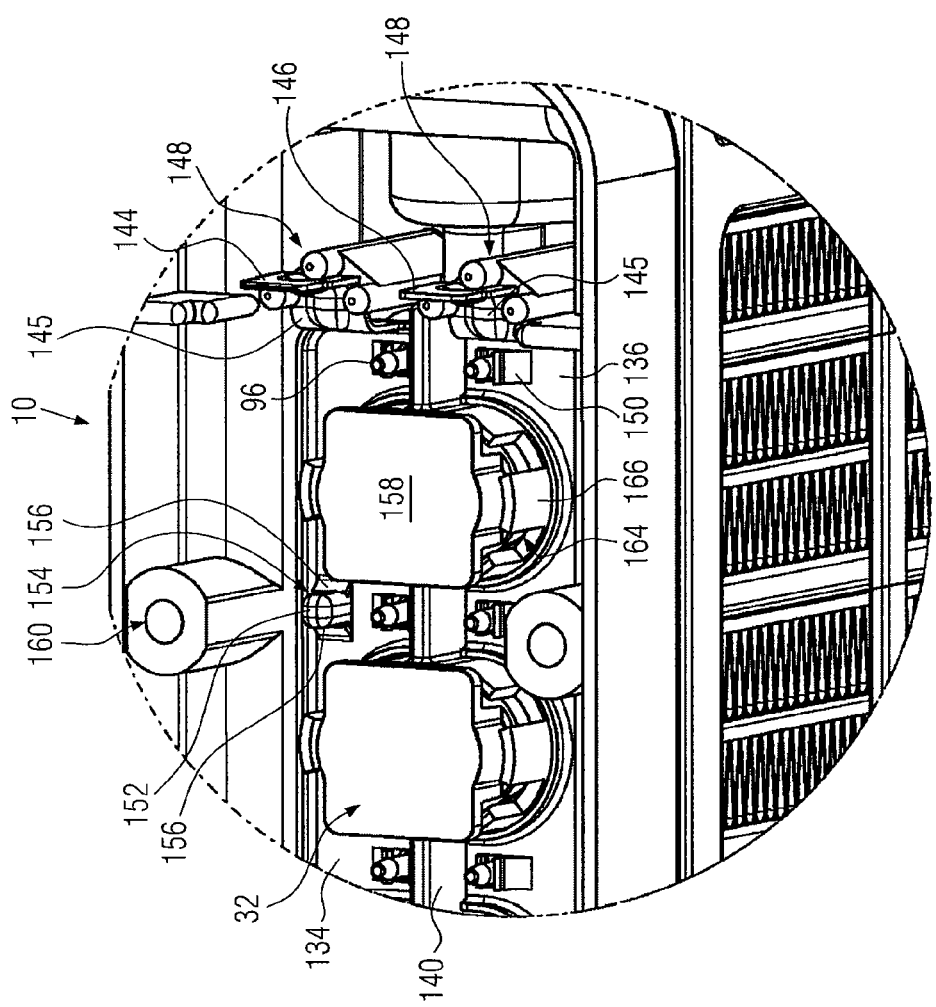
FIG. 8 the detail VIII drawn in FIG. 7 in an enlarged illustration.

FIG. 8 also shows the previously described heat sinks 32, which are exposed within the plastic housing element 10 and protrude over the partition ridge 140 on the upper side with a flat contact base 158.

Centrally between the heat sinks 32 and at the edge of the plastic housing element 10 mounting eyes 160 can be seen in each case for the previously generally mentioned pressure element 20. As particularly illustrated in FIGS. 4 and 9, this is formed honeycomb-shaped with a large number of honeycomb ridges 162 extending at right angles.

Figure 9:
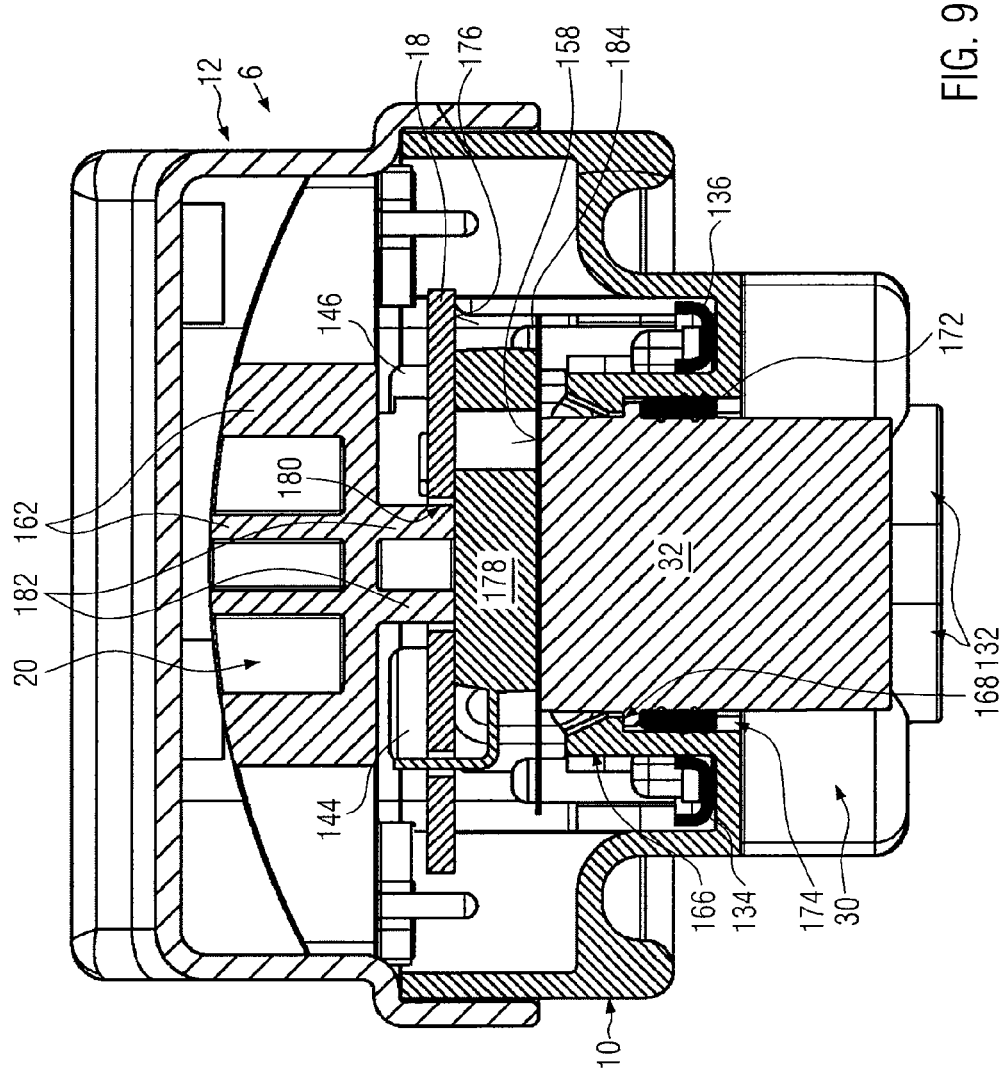
FIG. 9 a cross-sectional view of the connecting housing of the electrical heating device according to FIG. 1 at the height of a heat sink.

The sectional view according to FIG. 9 illustrates the installation of the heat sink 32 into the plastic housing element 10. As can be seen from FIG. 8, this has a large number of latching posts 166, provided distributed on the circumference of a raised heat sink insertion opening 164 of the plastic housing element 10, which constrict the heat sink insertion opening 164 conically at the edge and form latching shoulders 168, which grasp over a circumferential latching ridge 170 formed on the heat sink 32, thus frictionally preventing pressing out upwards and in the direction onto the connecting housing 6. The contour of the recesses 143 of the contact surface elements 134, 136, 138 corresponds to the contour of the heat sink insertion opening 164 so that its raised edge is closely delimited by the contact surface elements 134, 136, 138. The two plus contact surface elements 134, 138 are formed identically so that they can be alternatively used for the formation of the first or second contact surface element 134 or 138. On the side of the latching ridge 170 opposite the latching shoulder 168 there is a sealing element 172 which circumferentially surrounds the heat sink 32 and is supported on the underside facing away from the latching ridge 170 in the circumferential direction by ridges which cannot be discerned in FIG. 9, so that the sealing element 72 cannot slide in the direction towards the power section 2 through a sealing receptacle labeled with the reference numeral 174. This sealing receptacle 174 is formed in one piece with the plastic housing element and extends the heat sink insertion opening 164.

In FIG. 9 the sealing element is illustrated in an only slightly compressed embodiment. The sealing element 172 can however be compressed in the longitudinal direction of the sealing receptacle 174 in that sealing between the inner circumferential surface of the cylindrical sealing receptacle 174 and the external circumferential surface of the heat sink 32 is lost. The sealing element 172 can here be compressed by about 2/10 to 7/10 mm by displacement of the latching ridge 170 in the longitudinal extension of the sealing receptacle 174. The equalization movement is applied by screwing the pressure element 20 onto the mounting eyes 160 after assembly of the conductor board 18, which is provided with two semiconductor power switches 178 on its underside 176 facing the heat sink 32. Each power switch 178 is located on the flat contact base 158 of the assigned heat sink 32. At the height of the power switch 178 the conductor board in each case has a hole 180, which is penetrated by pressure ridges 182 of the pressure element 20. These pressure ridges 182 directly abut the power switch 178 and press it against the heat sink 32. Since the power switch 178 may have substantial manufacturing thickness tolerances, the sealing element 172 provided in the embodiment facilitates an equalization by the receding of the heat sink 32 in the direction towards the power section 2 without the sealing of the heat sink 32 in the plastic housing element 10 being lost. As can be taken from the overall view, in particular from FIGS. 4 and 9, after screwing against the plastic housing element 10 the pressure element 20 acts on both power switches 176 and presses each of them against the heat sink 32 assigned to them. Due to an insulating layer 184 placed on the contact base 158 of the heat sink 32, the power switch 178 is electrically insulated from the assigned heat sink 32. The insulating layer 174 is a ceramic insulating layer. Also this insulating layer 184 protrudes beyond the heat sink 32 to enlarge the creep path substantially in the width direction (cf. FIG. 9).

The contact surface elements 134, 136 contact the conductor board 18 through contact tongues 144, 146. A second plus contact tongue 186 (cf. FIG. 4) with the second contact surface element 138 protruding over it connects the heating circuit formed by the second plus contact surface element 138 and the minus contact surface element 136 to the conductor board 18 (cf. FIG. 4). As can be seen furthermore from FIG. 9, the semiconductor power switch 178 contacts the conductor board 18 and switches the power current to the associated circuit. In the present case two heating stages are realized, each of which can be switched and controlled through one of the semiconductor power switches 178.

Sealed Heat Sink

As previously described, the heat sink 32 is also retained sealed in the heat sink insertion opening 164. Here the embodiment, i.e. the one in FIG. 9, illustrates a situation in which the power switch 178 has the smallest thickness within the conceivable tolerance range. In this case the latching ridges 170 are located directly below the latching shoulders 168. Touching does not however take place, so that the compression force caused by the—even if only slight—compression of the sealing element 172 acts on the phase boundary between the heat sink 32 and the power switch 178. This power switch 178 in each case abuts on the underside 176 against the conductor board 18 independently of the thickness tolerance. With its pressure ridges 82 the pressure element 20 only relieves the conductor board 18 so that the power switch 178 is held clamped not through the conductor board 18, but rather only between the pressure element 20 and the heat sink 32 effecting the tension with the intermediate positioning of the insulating layer 184.

Correspondingly, the position of the power switch 178, the conductor board 18 and the pressure element 20 does not change with a power switch 178 having greater thickness. Rather, the heat sink 32 in the heat sink insertion opening 164 is forced in the direction towards the power section 2, so that the sealing element 172 compresses more while retaining the sealing of the heat sink 32 and—compared to the illustration in FIG. 9—the latching ridges 170 are arranged in a further lowered position, i.e. spaced further from the latching shoulders 168.

Defined Abutment Points for the PTC Element; Air Clearance and Creep Path

The embodiment of an electrical heating device illustrated in the figures has heat generating elements, which are formed in a special way to lengthen creep paths and to reduce the risk of creepage current transmission. This special arrangement is elucidated in the following, in particular with reference to FIGS. 2 and 11. Thus—as can be seen in FIG. 2—each receptacle 78 specified by a basically flat inner circumferential surface of the positional frame 76 has on oppositely situated sides at least two protrusions labeled with reference numeral 188. The protrusions 188 define supporting points for in each case one PTC element 80 within the receptacle 78. These supporting points 188 prevent the PTC elements 80 from directly abutting the smooth inner wall of the positional frame 76 defining the receptacle 78. Thus, the creep path between opposite surfaces of the PTC elements 80 is enlarged.

As can be seen in particular in FIG. 2, the supporting points 188 are essentially formed pyramid-shaped and therefore have a form tapering to the tip. Furthermore, the surfaces of the supporting points 188 are curved concave, as the sectional view in FIG. 11 shows. The curvature of the surface also enlarges the creep path further. The previously mentioned circumferential gap 84 provided between the contact plates 82 and the positional frame also contributes to extending the creep paths.

Special EMC Protection of the Embodiment

Furthermore, the heat generating elements 66 are particularly EMC protected. For example, the positional frame 76 is basically completely surrounded by a screen, which is formed on one hand by the sheet metal cover 110 of the positional frame 76 and on the other hand by the sheet metal cover 70 of the corrugated-rib elements 64. As illustrated in FIG. 11, only a small gap at the edge between the different covers 70, 110 remains. Other than that, the PTC elements 80 are completely enclosed by a metal screen. Accordingly the heat generating elements 66 cannot emit any substantial electromagnetic radiation.

All the corrugated-rib elements 64 are furthermore joined together by latching elements formed on the metal shell 8, which are not illustrated in the drawing, but can be formed as described in EP 2 299 201 A1 which originates from the applicant, the disclosure of which, to this extent, is included in the disclosure content of this application. It only matters that the metal shell 8 electrically forms joined protrusions which contact the corrugated-rib elements 64 such that all corrugated-rib elements 64 are directly or indirectly electrically joined to the metal shell 8 and are connected to ground.

Sealing and Sealing Test

The previously discussed embodiment has heat generating elements 66, the receptacle 78 of which is hermetically sealed with respect to the ambient, so that moisture and contamination cannot access the PTC elements 80. In this way high insulation of the PTC elements 80 is obtained, since any charge carriers of the insulation of the PTC elements 80, which can access the receptacle 78 in the state of the art, impair the insulation. With the present invention also all heat generating elements 66 are inserted into the connecting housing 6. Normally for checking the required sealing after joining the power section 2 a testing bell is placed on the plastic housing element 10 on its free end, which is usually closed off by the housing cover 12, the said testing bell abutting the free edge of the plastic housing element 10 for sealing. Through this testing bell the part of the electrical heating device connected to it is subjected to increased hydrostatic pressure, for example by compressed air. A certain pressure level is held and checked whether it is reduced over time by any leaks. If this is not the case, the component is assessed as passing the test.

Simplified Assembly

Accordingly, firstly during the manufacture of the illustrated embodiment the power section 2 is manufactured separately. First, the heat generating elements 66 are assembled. Here, the sheet metal cover 110 can close off the underside and thus, in any case after the adherence of the insulating layer 90 assigned to the sheet metal cover 110, the positional frame 76 which is open on one side on the underside, so that the PTC elements 80 can be inserted from the other side and then the assigned contact plate 82 can be placed on them to finally put the insulating layer 90 in place on the said contact plate and to seal it against the positional frame 76 through the adhesive edging 88. In the described method with particular reference to FIG. 11 the thus prepared heat generating elements 66 are put into a frame element 48 of the frame 44 and namely in each case alternating with respect to the arrangement of corrugated-rib elements 64. As arises particularly from FIG. 4, two corrugated-rib elements 64 normally abut in each case between two heat generating elements 66. In other words a layer L of corrugated-rib elements abut on each side of a heat generating element 66. The comparison between FIG. 4 and FIG. 11 also shows that in the embodiment according to FIG. 4 at least two corrugated-rib elements 64 are arranged in a layer.

Once all elements of the layer structure 46 have been placed into the frame element 48, the frame 44 is closed by putting the other frame element 48 into place and latching it. Thereafter, the respective spring elements 121 are inserted through the spring insertion openings 120 between the layer structure 46 and an external edge of the receptacle 60 produced by the frame 44. Finally, the spring elements 121 are clamped against one another as described in EP 2 298 582. Thereafter, the power section 2 prepared in this way is joined to the metal shell 8 and the plastic housing element 10. Due to their form tapering to a tip, the ramp surfaces 124 here act as positioning and centring aids, so that the retaining element 126 can be effectively introduced into the positioning opening 127. The retaining element 126 normally here precedes the contact pins 96 so that first coarse positioning is carried out using the retaining elements 126 and then the contact pins 96 are introduced into the cylindrical sleeve receptacles 132.

Improved Thermal Transfer

FIGS. 12 to 15 illustrate a further aspect of the present invention in that the corrugated-rib elements 64 provided one behind the other in the flow direction in a layer L are provided in a direction transverse to the flow direction S but offset to one another in their corresponding installation level within the layer structure 46. Accordingly, in the enlarged side view of a heating bar 62 illustrated in FIG. 12 the meander-type, bent sheet metal strips 68 of the corrugated-rib elements 64 can be seen provided in a layer L one behind the other. They are labeled with reference numerals 68.1 and 68.2 and can thus be differentiated. It is apparent that the air to be heated flowing at right angles to the drawing plane flows over almost completely separate meander-type, bent sheet metal strips 68.1 and 68.2. In particular the rear sheet metal strip element is not shaded by the front one. Good thermal transfer is produced. Furthermore, the air flow S to be heated is redistributed during the transfer from the first level E1 to the second level E2, which is accompanied by turbulent flow, by means of which the thermal transfer is also improved.

Figure 14:
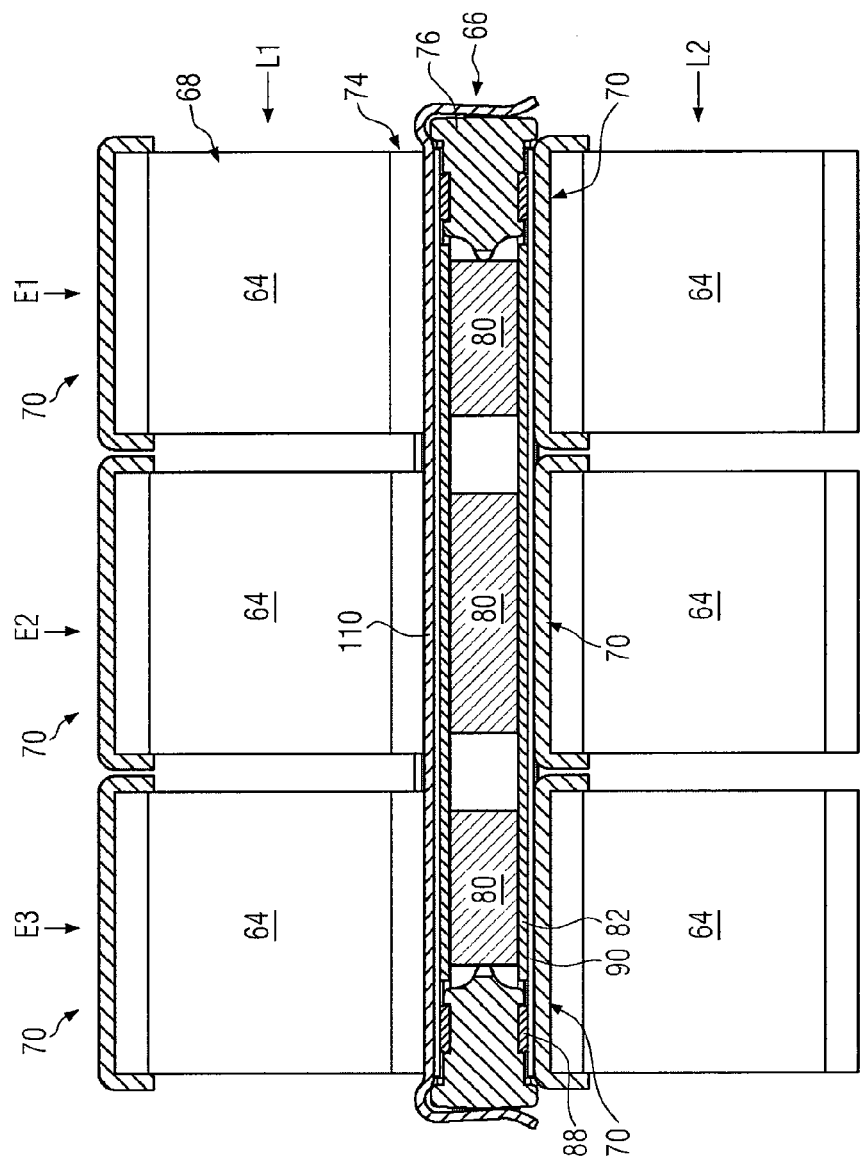
FIG. 14 a cross-sectional view along the line XIV-XIV according to the illustration in FIG. 13.

FIGS. 13 to 15 show a second embodiment according to FIGS. 10 to 12. The illustrated embodiment of a heating bar only differs from the embodiment previously discussed in that three corrugated-rib elements 64 are arranged one behind the other in a layer L1 respectively L2. Here too, corrugated-rib elements 64 each arranged in a level E1, E2, E3 are each strictly assigned to a PTC element 80. As FIG. 15 illustrates, the air flowing through the heating bar 62 is redistributed many times. The labyrinth of sheet metal strips 68.1, 68.2 and 68.3 formed in each case by the meander-type sheet metal strips 68 provided offset to one another leads to very good thermal transfer and power output.

Modular Structure of the Frame

Figure 16:
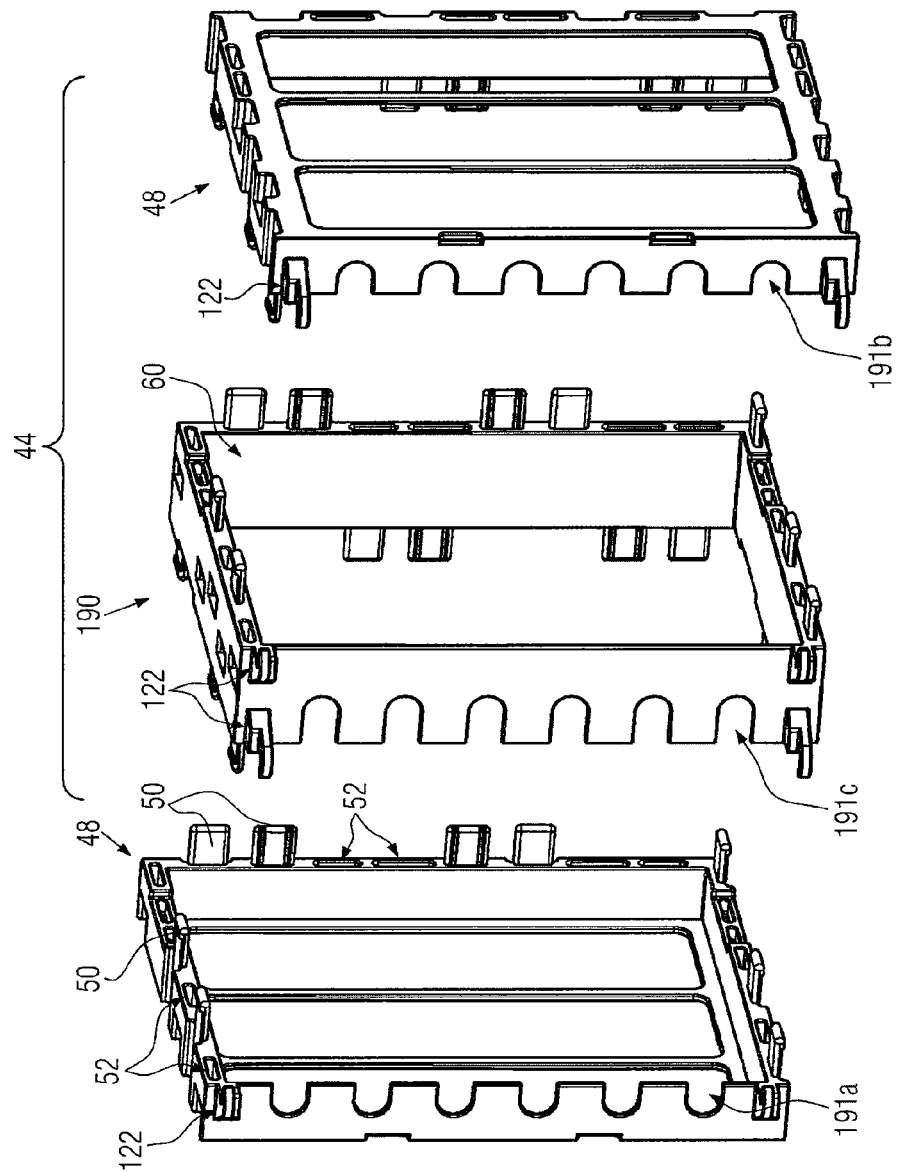
FIG. 16 a perspective exploded view of a frame suitable for accommodating heating bars according to FIGS. 13 to 15.

FIG. 16 shows the already previously described frame elements 48 as well as a frame intermediate element 190 which is provided with female and male latching elements 50, 52 corresponding to the frame elements 48, so that the frame intermediate element 190 can be latched between the frame elements 48 in a simple manner. The receptacle 60 provided in the frame for the layer structure 46 is thus enlarged exactly by the width contributed by the corrugated-rib element 46. With the embodiments of heating bars 62 illustrated in FIGS. 10 to 15 the heat generating elements 66 are each formed uniformly, i.e. irrespective of whether two or three PTC elements 80 are arranged one behind the other in the flow direction S; the PTC elements 80 are each accommodated within a uniform positional frame 76. The corrugated-rib elements 64 are however identical. For the heating bars 62 provided with three corrugated-rib elements 64 arranged adjacent to one another and the heating bars 62 provided with two corrugated-rib elements 64, one identical plastic housing element 10 can be used in each case. This is because the frame intermediate element 190 has retaining element parts 122 which interact with the retaining element parts 122 of one of the frame elements 48 in order to form a complete retaining element 126 through which also the widened frame 44 according to FIG. 16 can be joined to the plastic housing element 10. If, for example, four corrugated-rib elements 64 arranged one behind the other in the flow direction form a heating bar, then a second frame intermediate element 190 can be built into the frame 44.

Figure 17:
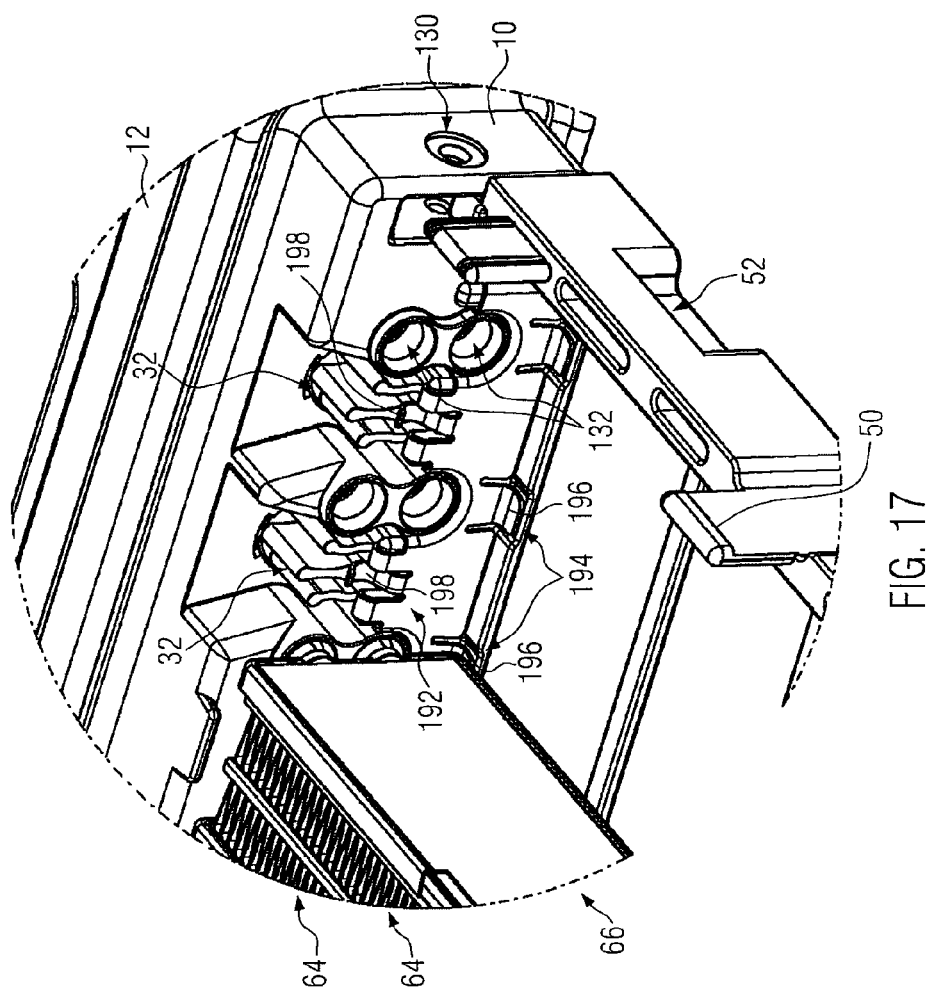
FIG. 17 a perspective plan view onto the edge area of a further embodiment of a heating device according to the invention, partially omitting layers of the layered structure, and FIG. 18 a partially cut-away perspective side view of the embodiment illustrated in FIG. 17.
Figure 18:
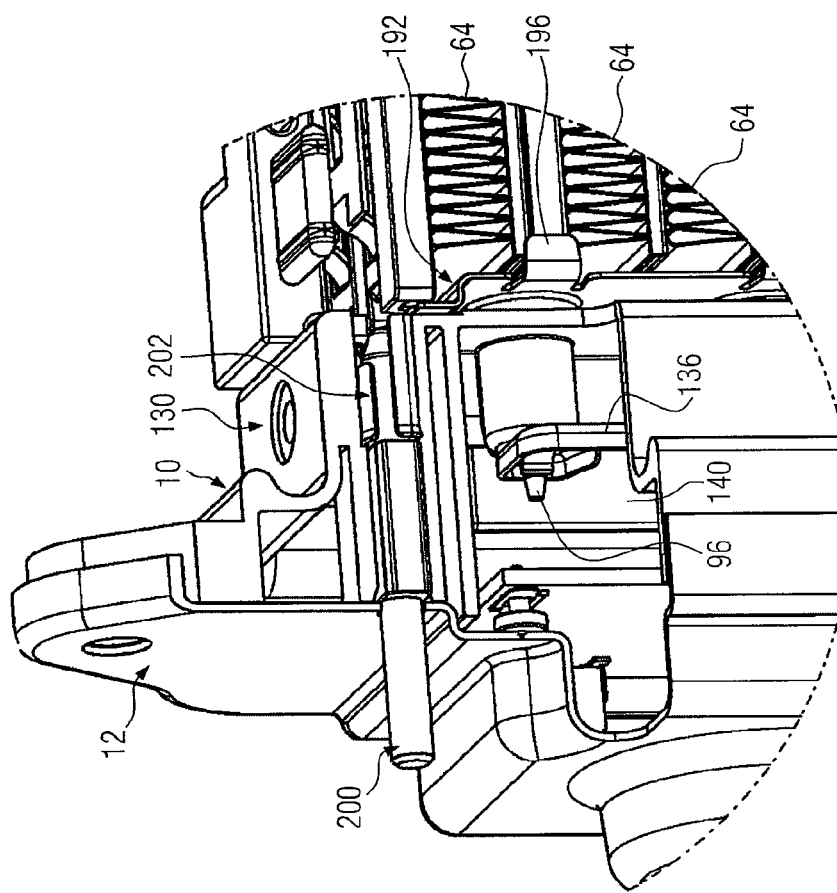

Compared to the previously described embodiment, FIGS. 17 and 18 illustrate a slightly different embodiment. The same parts are labeled with the same reference numerals. The previously described screening housing element 8 particularly differs in the embodiment shown in FIGS. 17 and 18.

Instead of a shell-shaped housing element accommodating the plastic housing element 10, a screening contact plate 192 is provided which abuts, positively locked, outer contact bases of the plastic housing element 10. This furthermore forms cavities 194 in which screening contact tongues 196 of the screening contact plate 192 are accommodated. The screening contact tongues 196 are each provided at the height of a heat generating element 66 and contact the edge 112 of this element 66. Furthermore, the screening contact plate 192 forms spring bars 198, formed by punching and bending, which each abut one of the heat sinks 32 on the face side and contact it. As can be especially seen in FIG. 18, the screening contact plate 192 closely surrounds the cylindrical sleeve receptacle 132, which is formed by the plastic housing element 10.

Furthermore, as can particularly be taken from FIG. 18, the embodiment illustrated in FIGS. 17 and 18 has a connecting bolt 200 connected to ground. This connecting bolt 200 is, for example, held in the plastic housing element 10 by overmoulding. The screening contact plate 192 clipped to the plastic housing element 10 forms a bolt receptacle 202 made through punching and bending which abuts the connection bolt 200 for electrical conduction under elastic circumferential stress.

Complete screening of all current-carrying elements of the embodiment is produced. Furthermore, the heat sinks 32 are connected to ground through the screening contact plate 192, so that the reliable electrical insulation between the power switch 178 and the heat sink 32 can be checked by monitoring the ground potential obtained on the connecting bolt 200. Any defect in the electrical insulation can be detected and output to prevent the service personnel from receiving an electrical shock during service work on the electrical heating device due to inadequate electrical insulation.

What is claimed is:

1. A heat generating element for an electrical heating device of a motor vehicle, comprising:
   a positional frame which forms a receptacle in which a PTC element is accommodated,
   abutting contact plates on two oppositely situated sides of the PTC element, and
   several supporting points provided in a circumferential direction of the receptacle, the supporting points being spaced apart in a circumferential direction of the receptacle and protruding beyond flat surface sections of the positional frame to define punctiform support portions supporting the PTC element for holding the PTC element at a distance to the flat surface sections of the positional frame, wherein the supporting points are formed such that they taper to a tip, and wherein at least one supporting point is in contact with the PTC element.

2. A heat generating element according to claim 1, wherein the supporting points exhibit curved surfaces.

3. A heat generating element according to claim 1, wherein the contact plates are spaced a distance from the positional frame.

4. A heat generating element according to claim 1, the contact plates have, on an outside thereof, an insulating layer abutting the positional frame in a sealing manner, and wherein at least one of the insulating layers is covered by a sheet metal cover that is joined to the positional frame.

5. A heat generating element according to claim 4, wherein the sheet metal cover has an edge that surrounds the positional frame essentially fully circumferentially.

6. A heat generating element according to claim 1, wherein the contact plates are provided only within an envelope surface specified by the positional frame.

7. A heat generating element according to claim 1, wherein the positional frame forms outwardly projecting channels for receiving contact elements that lead to the contact plates.

8. A heat generating element according to claim 4, wherein at least one of the contact plates and the insulating layers are formed identically.

9. A heat generating element according to claim 1, wherein the contact plates are joined to at least one of the positional frame and the contact elements via clip connections.

10. A heat generating element according to claim 9, wherein each contact plate is provided on opposite sides thereof with at least one female clip element receptacle, wherein the clip element receptacle on one side of each contact plate is joined to the contact element, and wherein the clip element receptacle provided on the oppositely situated side of the associated contact plate is joined to a clip ridge formed on the positional frame.

11. A heat generating element for an electrical heating device of a motor vehicle, comprising:
    a positional frame which forms a receptacle in which a PTC element is accommodated,
    abutting contact plates on two oppositely situated sides of the PTC element, and
    several supporting points provided in a circumferential direction of the receptacle, the supporting points being spaced apart in a circumferential direction of the receptacle and protruding beyond flat surface sections of the positional frame to define punctiform support portions supporting the PTC element for holding the PTC element at a distance to the flat surface sections of the positional surface, wherein each of the contact plates has, on an outside thereof, an insulating layer abutting the positional frame in a sealing manner, and wherein at least one of the insulating layers is covered by a sheet metal cover that is joined to the positional frame, and wherein at least one supporting point is in contact with the PTC element.

12. A heat generating element according to claim 11, wherein the sheet metal cover has an edge that surrounds the positional frame essentially fully circumferentially.

13. A heat generating element according to claim 11, wherein the contact plates are provided only within an envelope surface specified by the positional frame.

14. A heat generating element according to claim 11, wherein the positional frame forms outwardly projecting channels for receiving contact elements that lead to the contact plates.

15. A heat generating element according to claim 11, wherein at least one of the contact plates and the insulating layers are formed identically.

16. A heat generating element according to claim 11, wherein the contact plates are joined to at least one of the positional frame and the contact elements via connections.

17. A heat generating element according to claim 16, wherein each contact plate is provided on opposite sides thereof with at least with one female clip element receptacle, and wherein the clip element receptacle on one side of each contact plate is joined to the contact element and the clip receptacle provided on the oppositely situated side of the associated contact plate is joined to a clip ridge formed on the positional frame.

18. A heat generating element for an electrical heating device of a motor vehicle, the heat generating element comprising:

a positional frame, which forms a receptacle in which a PTC element is accommodated, abutting contact plates on two oppositely situated sides of the PTC element, and several supporting points provided in a circumferential direction of the receptacle and protruding beyond flat surface sections to define punctiform support portions supporting the PTC element, wherein each contact plate is provided on opposite sides thereof with at least with one female clip element receptacle, and wherein the clip element receptacle on one side of each contact plate is joined to the contact element and the clip receptacle provided on the oppositely situated side of the associated contact plate is joined to a clip ridge formed on the positional frame.

19. A heat generating element according to claim 18, wherein the supporting points are formed such that they taper to a tip, and wherein the supporting points exhibit curved surfaces.

20. A heat generating element according to claim 19, wherein the contact plates have, on an outside thereof, an insulating layer abutting the positional frame in a sealing manner, and wherein at least one of the insulating layers is covered by a sheet metal cover that is joined to the positional frame.

21. A heat generating element according to claim 7, wherein each contact plate is provided on opposite sides thereof with at least one female clip element receptacle, wherein the clip element receptacle on one side of each contact plate is joined to the contact element, and wherein the clip element receptacle provided on the oppositely situated side of the associated contact plate is joined to a clip ridge formed on the positional frame, and wherein the contact plates are joined to at least one of the positional frame and the contact elements via clip connections.

* * * * *